(12) United States Patent
Bradford

(10) Patent No.: US 11,720,155 B2
(45) Date of Patent: Aug. 8, 2023

(54) SYSTEM AND METHOD OF REGULATING USAGE OF AN ELECTRONIC DEVICE

(71) Applicant: Kito Bradford, Rockville, MD (US)

(72) Inventor: Kito Bradford, Rockville, MD (US)

( * ) Notice: Subject to any disclaimer, the term of this patent is extended or adjusted under 35 U.S.C. 154(b) by 402 days.

(21) Appl. No.: 16/686,161

(22) Filed: Nov. 17, 2019

(65) Prior Publication Data

US 2020/0159298 A1 May 21, 2020

Related U.S. Application Data

(60) Provisional application No. 62/768,680, filed on Nov. 16, 2018.

(51) Int. Cl.
| | |
|---|---|
| *G06F 1/26* | (2006.01) |
| *E05B 73/00* | (2006.01) |
| *H04B 3/02* | (2006.01) |
| *H01R 13/639* | (2006.01) |
| *H04L 67/306* | (2022.01) |
| *E05B 47/00* | (2006.01) |
| *G06F 21/81* | (2013.01) |
| *H04N 21/45* | (2011.01) |
| *H04N 21/475* | (2011.01) |

(52) U.S. Cl.
CPC ............ *G06F 1/26* (2013.01); *E05B 73/0082* (2013.01); *H01R 13/6397* (2013.01); *H04B 3/02* (2013.01); *H04L 67/306* (2013.01); *E05B 47/0002* (2013.01); *G06F 21/81* (2013.01); *H04N 21/4532* (2013.01); *H04N 21/4751* (2013.01)

(58) Field of Classification Search
CPC ....... G06F 1/26; G06F 21/81; H04N 21/4532; H04N 21/4751
USPC ................................ 713/300; 726/16; 725/29
See application file for complete search history.

(56) References Cited

U.S. PATENT DOCUMENTS 5,283,475 A * 2/1994 Berger .................. H01H 9/287
307/141.8
7,154,380 B1 * 12/2006 Tarrab, Jr. ............ G04G 15/006
348/730

(Continued)

OTHER PUBLICATIONS

Wikipedia entry, "Microcontroller", https://en.wikipedia.org/wiki/Microcontroller.*

(Continued)

*Primary Examiner* — Ji H Bae

(57) ABSTRACT

A method of regulating usage of an electronic device is provided that includes at least one remote server, a user personal computing (PC) device, an administrator PC device, at least one electronic device, and a computerized regulating adapter. The method begins by monitoring a current date-and-time with the computerized regulating adapter. An electrical plug is then physically secured to the computerized regulating adapter with a locking mechanism of the computerized regulating adapter. The electronic device is then electrically powered with the computerized regulating adapter, if the current date-and-time is any date-and-time from the plurality of available date-and-times. The electronic device is then disabled with the computerized regulating adapter, if the current date-and-time matches an arbitrary blocked date-and-time, wherein the arbitrary blocked date-and-time is any date-and-time from the plurality of blocked date-and-times.

12 Claims, 13 Drawing Sheets

(56) References Cited

U.S. PATENT DOCUMENTS

| | | | | |
|---|---|---|---|---|
| 8,523,668 B2* | 9/2013 | Rioux | ................... | A63F 13/98 |
| | | | | 463/47 |
| 9,935,956 B1* | 4/2018 | Cha | ................... | H04L 63/10 |
| 10,765,950 B1* | 9/2020 | Clementi | ............ | H01R 13/6658 |
| 2008/0157937 A1* | 7/2008 | Cohen | ................... | G08C 17/02 |
| | | | | 340/309.16 |
| 2013/0338844 A1* | 12/2013 | Chan | ................. | H01R 13/6683 |
| | | | | 700/286 |
| 2016/0344138 A1* | 11/2016 | Kazmier | ............... | H02J 7/0044 |

OTHER PUBLICATIONS

Dogan Ibrahim, "Microcomputer Systems; 1.2 Microcontroller Systems", 2014, https://www.sciencedirect.com/topics/computer-science/microcontrollers (Year: 2014).*

* cited by examiner

SYSTEM AND METHOD OF REGULATING USAGE OF AN ELECTRONIC DEVICE

The current application claims a priority to the U.S. Provisional Patent application Ser. No. 62/768,680 filed on Nov. 16, 2018.

FIELD OF THE INVENTION

The present invention relates generally to the usage of an electronic device. More specifically, the present invention generally relates to regulating usage of an electronic device, preferably by a parent for a child.

BACKGROUND OF THE INVENTION

Gaming consoles are a popular pastime that allows an individual to be entertained for many hours. Using gaming consoles, and other similar electronic devices, for extended periods of time, however, deterring an individual from doing other tasks, being productive, completing chores, and being physically active. Parents, guardians, and the like may have a more difficult time monitoring the use of the gaming consoles as they are easily positioned within a bedroom or a basement. Gaming consoles may also be portable; however, the charging docks also require an outlet or comparable power source as typical gaming consoles.

The present invention is a system and method of regulating the usage of an electronic device by controlling the connection between the electronic device and the corresponding power supply. The present invention allows an administrator to customize and implement a usage schedule that prevents a user from engaging with the electronic device for extended period of time. The present invention also analyzes the usage of the electronic device by the user, allowing the usage schedule to be adjusted accordingly.

DETAIL DESCRIPTIONS OF THE INVENTION

All illustrations of the drawings are for the purpose of describing selected versions of the present invention and are not intended to limit the scope of the present invention.

The present invention is a method of regulating usage of an electronic device. The physical system used to implement the method for the present invention includes at least one remote server, a user personal computing (PC) device, an administrator PC device, at least one electronic device, and a computerized regulating adapter, seen in FIG. 1A. At least one user account and at least one administrator account is managed by at least one remote server in order for the at least one administrator account to monitor the usage of the at least one electronic device by the at least one user account. The data and profile of the at least one user account and the at least one administrator account is stored with the remote server. All commands by the administrator account and any requests by the user account for the administrator account is processed with the remote server. The user account is able to view the overall usage of at least one electronic device and communicate with the administrator account. Similarly, the administrator account is able to monitor and regulate the usage of at least one electronic device by the user account as the administrator account is associated with the corresponding administrator PC device (Step A). The user PC device and the administrator PC device may be, but is not limited to, smart phones, tablets, smart watches, and laptops. The user account and the administrator account both download a software application that allows the user account and the administrator account to manage the computerized regulating adapter. Inputs from the user account and the administrator account are required such as username, passwords, contact information, and so on are required with the user PC device and the administrator PC device, respectively, in order to identify the type of account and what information is viewable and what operations are permissible depending on the type of account.

Figure 1A:
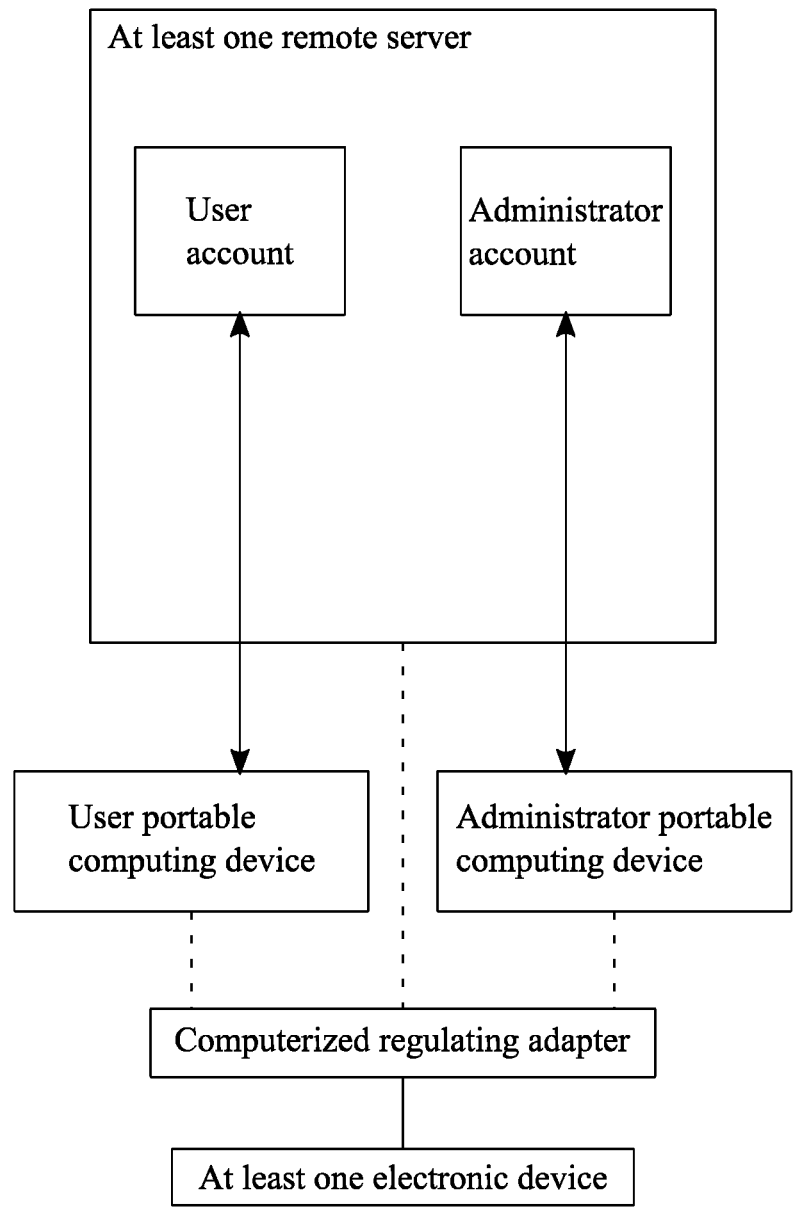
FIG. 1A is a schematic for a system used to implement the method of the present invention.
Figure 1B:
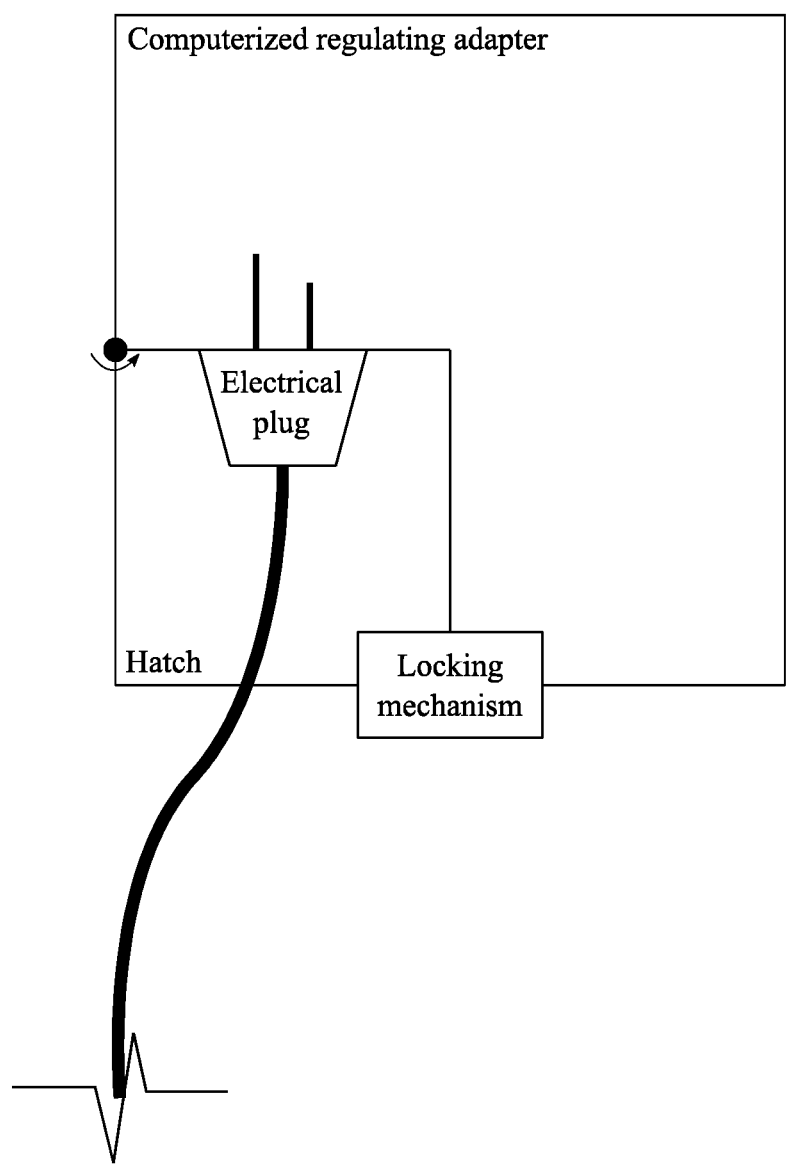
FIG. 1B is a schematic for a computerized regulating adapter of the present invention.

The electronic device, also seen in FIG. 1A, is also associated to both the user account and the administrator account (Step B) so that the administrator account may allow and limit the use of the electronic device by the user account. The electronic device is preferably a gaming console. In alternate embodiments of the present invention, the electronic device may also be a smart television, a desktop, and a variety of other electronic devices and electronic accessories that provide entertainment for the user or could be of use to the user. In order for the administrator account to control the usage of the electronic device by the user account, the electronic device is electrically coupled to the computerized regulating adapter. The computerized regulating, seen in FIG. 1B, adapter electrically connects and disconnects the power supply from an outlet with the electronic device. The user is not surprised or blindsided by the limits implemented by the administrator for the electronic device as a usage schedule of the electronic device is stored on the remote server, and the usage schedule includes a plurality of available date-and-times and a plurality of blocked date-and-times (Step C). The user and the administrator preferably discuss the usage schedule before limiting any usage of the electronic device with the user. The plurality of available date-and-times permits the usage of the electronic device with the user account, and the plurality of blocked date-and-times restricts the usage of the electronic device with the user account.

Figure 2:
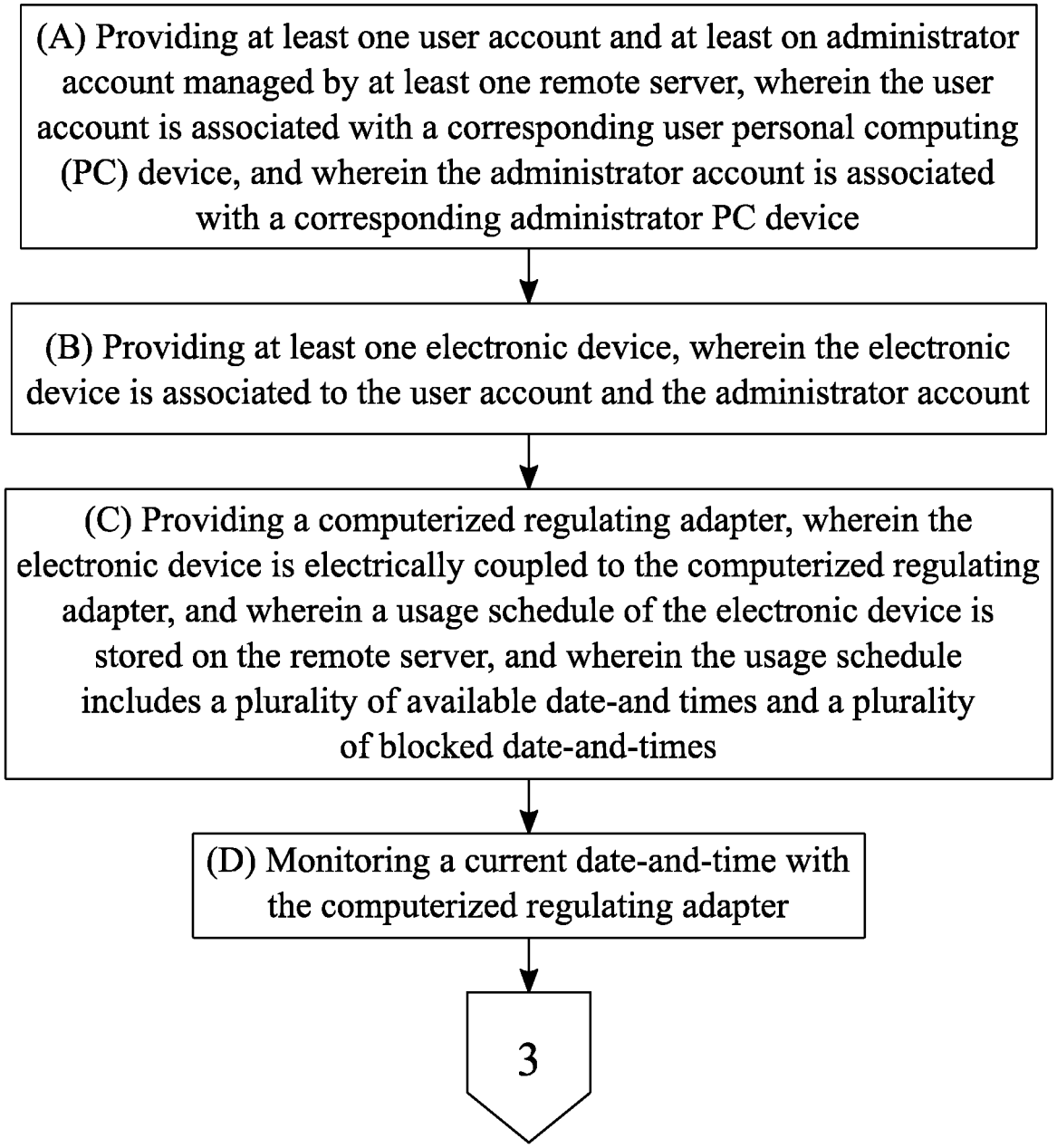
FIG. 2 is a flowchart illustrating the overall process for the method of the present invention.
Figure 3:
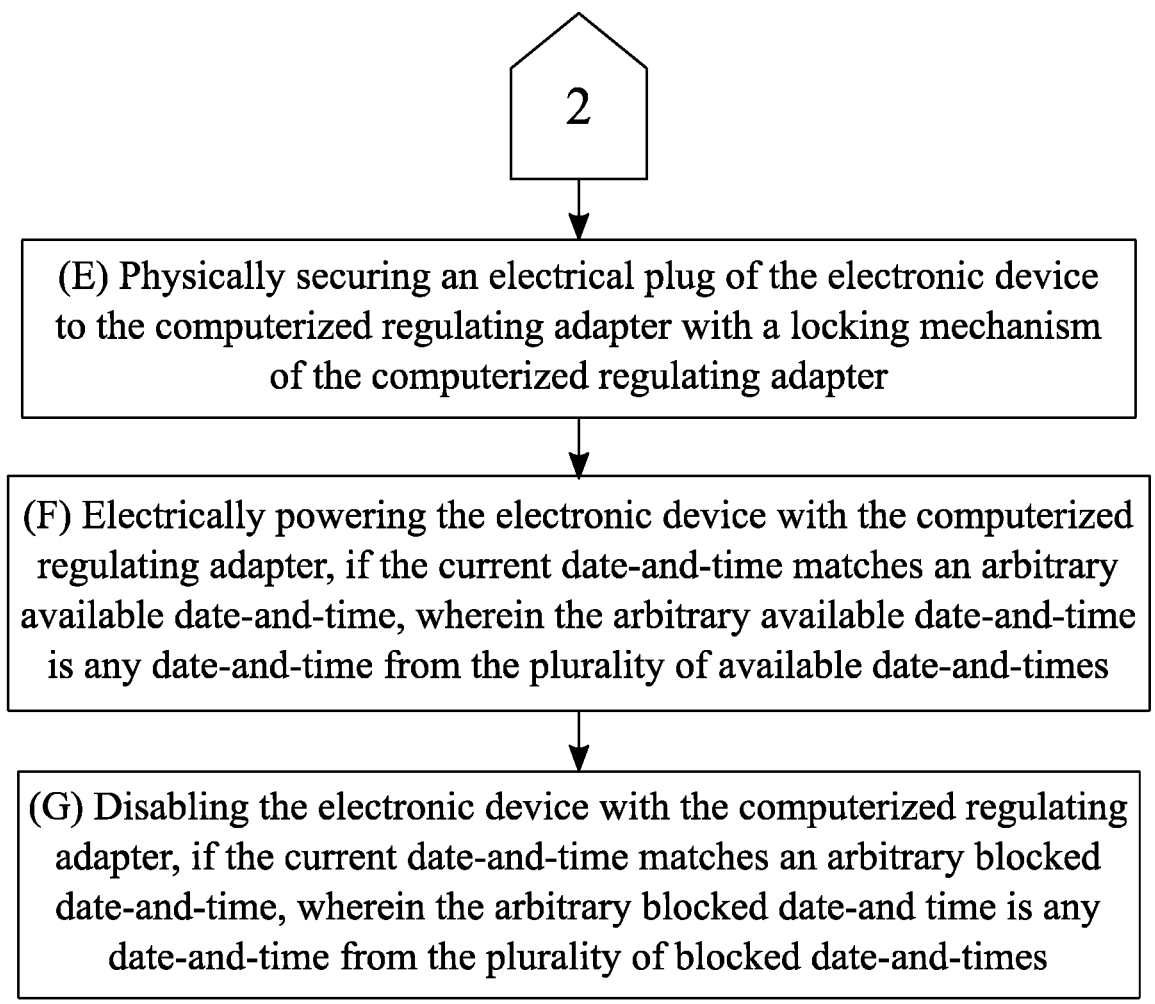
FIG. 3 is continuation of FIG. 2.

The overall process for the present invention includes the following steps that are implemented with the remote server, the user PC device, the administrator PC device, the least one electronic device, and the computerized regulating adapter. As can be seen in FIG. 2, the overall process begins by monitoring a current date-and-time with the computerized regulating adapter (Step D). The current date-and-time initiates a duration of usage within the usage schedule of the electronic device with the user account by serving as a time stamp for the user account. In order to turn off and turn on the electronic device according to the usage schedule, an electric plug of the electronic device is physically secured to the computerized regulating adapter with a locking mechanism of the computerized regulating adapter (Step E), seen in FIG. 3. The electronic plug of the electronic device connects the electronic device with a power source, preferably an outlet, through the computerized regulating adapter. The locking mechanism physically locks the electronic plug with the computerized regulating adapter, prohibiting the user from simply disconnecting the electrical plug with the computerized adapter and connecting the electrical plug with an outlet that is not regulated by the administrator account. The electronic device is electrically powered with the computerized regulating adapter, if the current date-and-time matches an arbitrary available date-and-time (Step F). The arbitrary available date-and-time is any date-and-time from the plurality of available date-and-times. Alternatively, the electronic device is disabled with computerized regulating adapter, if the current date-and-time matches an arbitrary blocked date-and-time (Step G). The arbitrary blocked date-and-time is any date-and-time from the plurality of blocked date-and-times. The powering and the disabling of the electronic device allows the user to use the electronic device in moderation and assures the administrator that the user is adhering to the usage schedule without having to physically be present and monitor the user.

Figure 4:
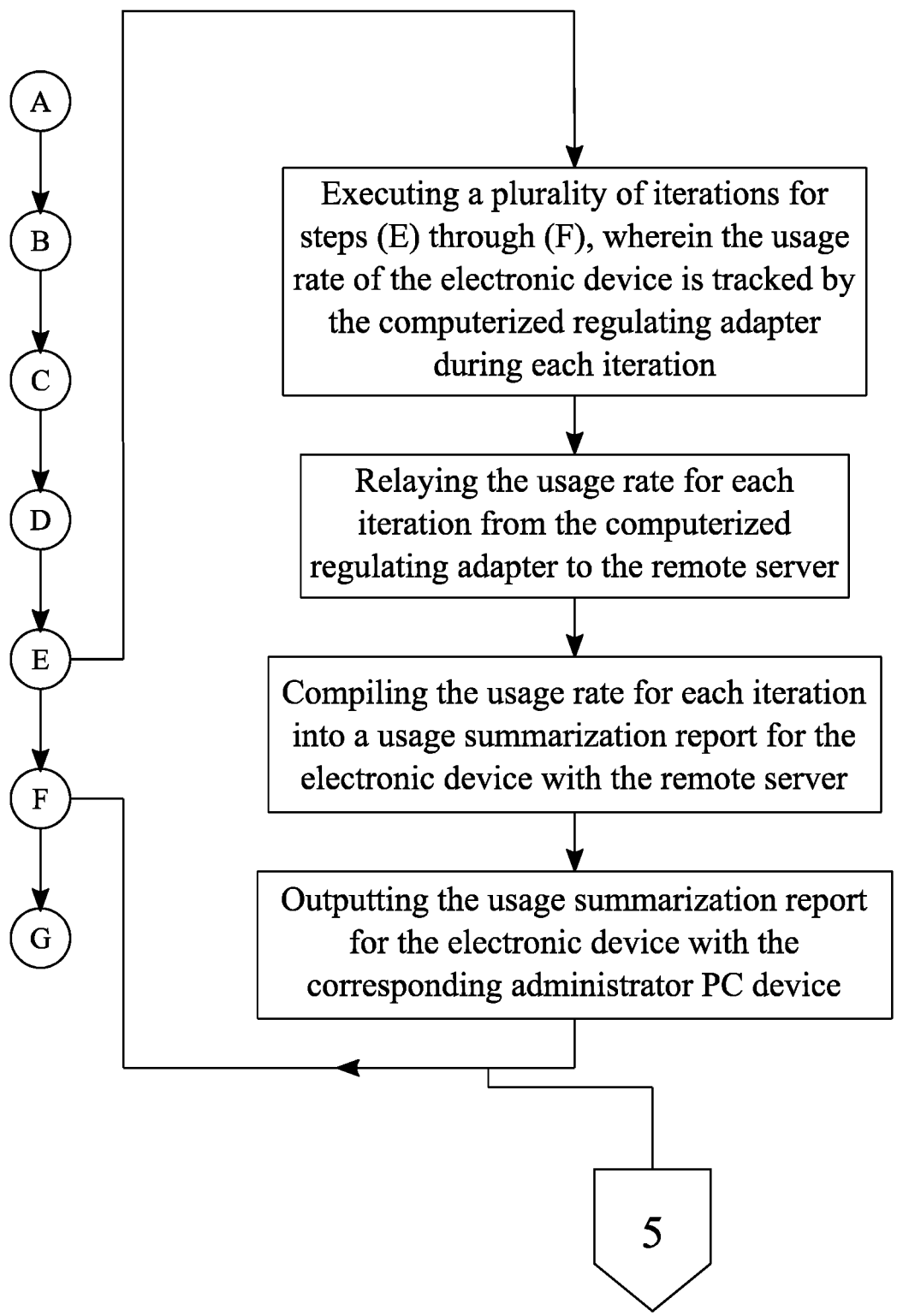
FIG. 4 is a flowchart illustrating the subprocess of outputting a usage summarization report for an administrator portable computing (PC) device.

In order to better account for the usage of the electronic device by the user account, a plurality of iterations for Step E through Step F is executed, and the usage rate of the electronic device is tracked by the computerized regulating adapter during each iteration, seen in FIG. 4. The usage rate is relayed for each iteration from the computerized regulating adapter to the remote server, associating the usage rate with the user account on the remote server. The usage rate is compiled for each iteration into a usage summarization report for the electronic device with the remote server. The usage summarization report provides the frequency of usage, the duration of usage, and the activity on the electronic device by the user account for the administrator account. The administrator is better able to analyze the usage of the electronic device by the user account and review the usage schedule according to any new habits that the user may develop. The administrator account is able to view and analyze the usage summarization report, as the usage summarization report for the electronic device is outputted with the corresponding administrator PC device. The administrator account may view the usage summarization report for an individual user account or multiple user accounts.

Figure 5:
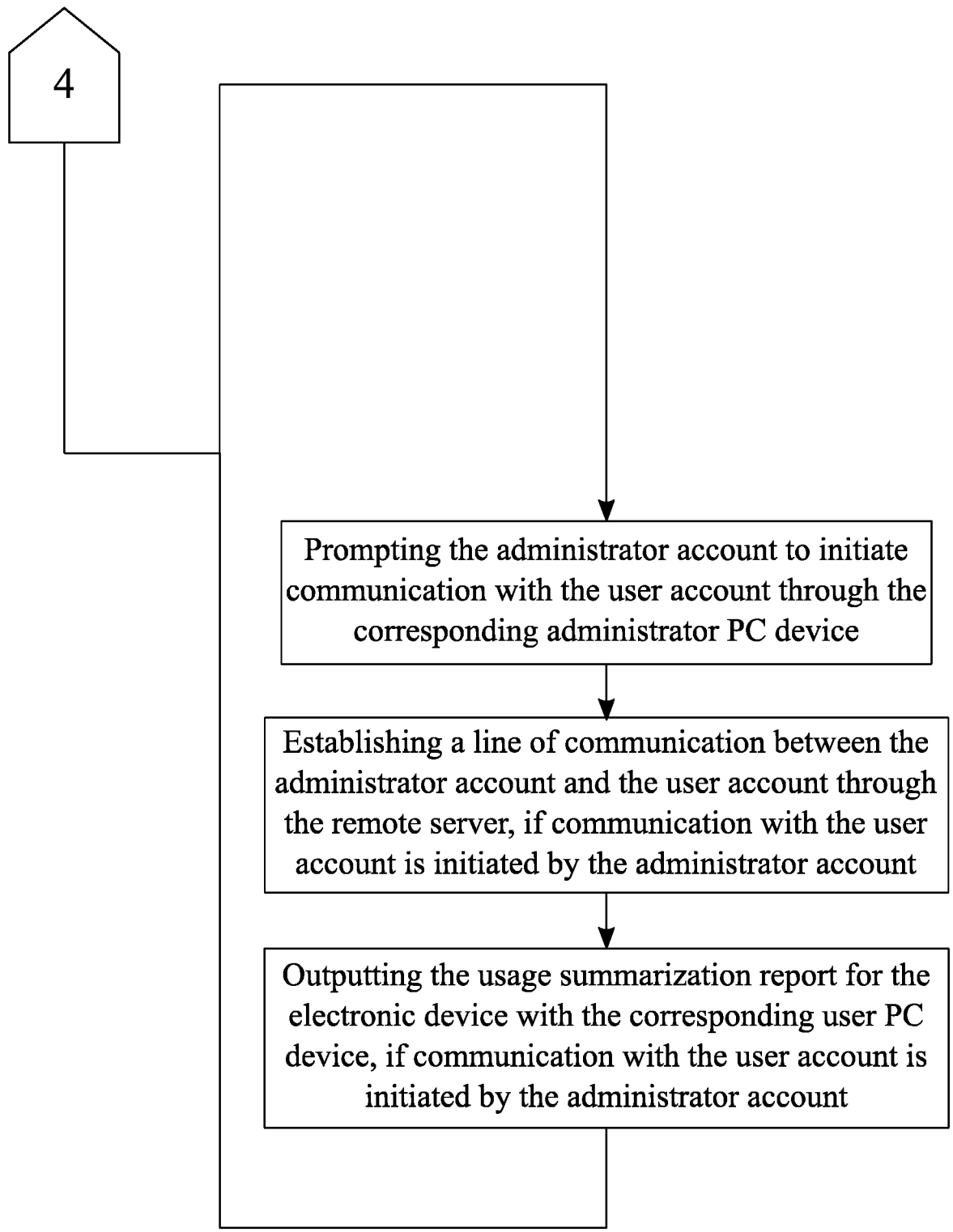
FIG. 5 is a flowchart illustrating the subprocess of outputting a usage summarization report for a corresponding user PC device.

The administrator account may deliver the usage summarization report to the user account, if the administrator notices any notable changes in usage rate of the user account. In order to deliver the usage summarization report, the administrator account is prompted to initiate communication with the user account through the corresponding administrator PC device, as seen in FIG. 5. A line of communication is established between the administrator account and the user account through the remote server, if communication with the user account is initiated by the administrator account. The line of communication is preferably with a messaging feature of a software application associated with the present invention. The usage summarization report is outputted for the electronic device with the corresponding user PC device, if the communication with the user account is initiated by the administrator account. This allows the user account to view the usage summarization report through the user PC device, independently.

Figure 6:
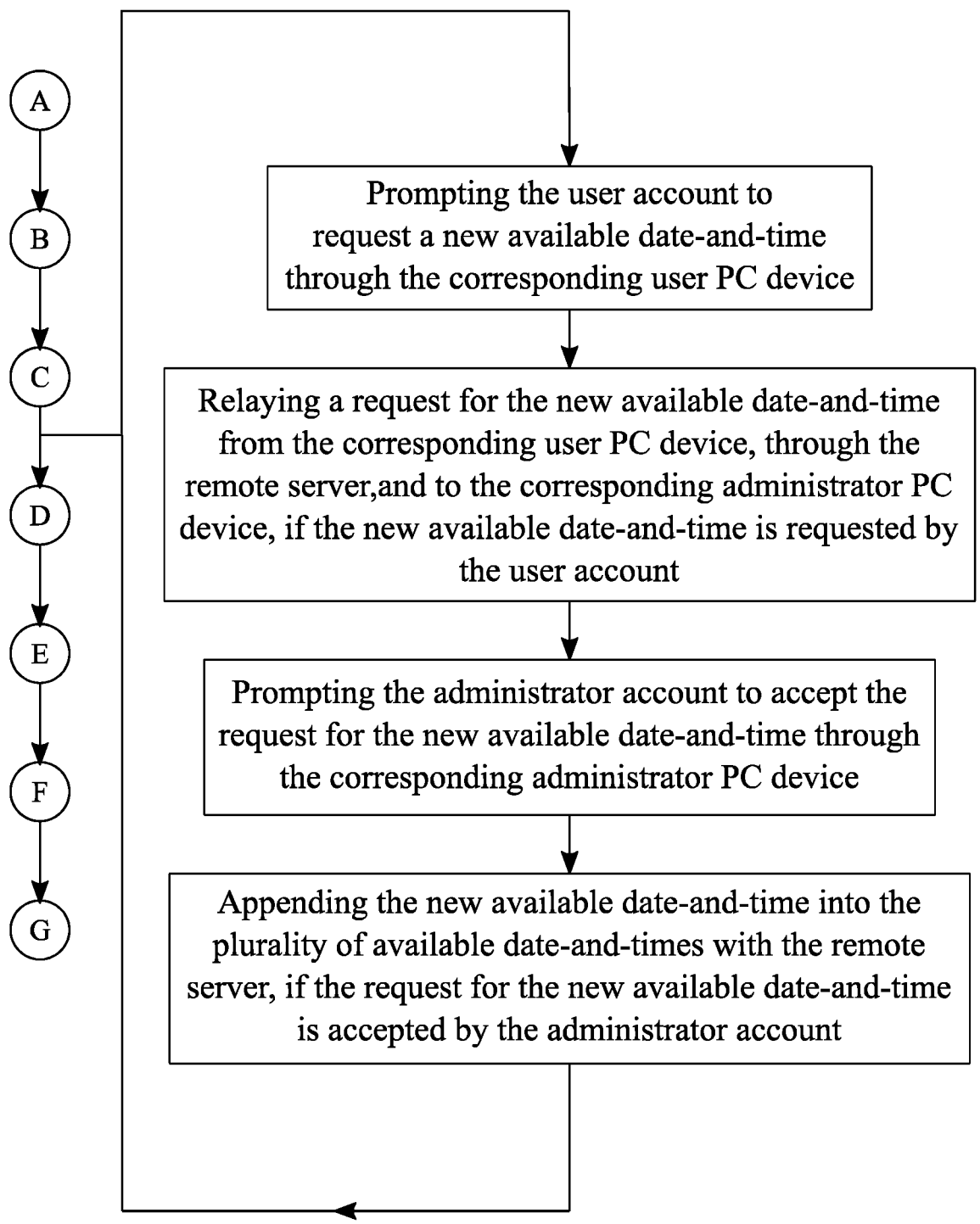
FIG. 6 is a flowchart illustrating the subprocess of adjusting a usage schedule, as requested by a user account, by adding additional usage time for the plurality of available date-and-times.

After the user account has viewed the usage summarization report, or at any point in time, the user account may adjust the usage schedule only with the approval of the administrator account. In order for the administrator account to be made aware of the request, the user account is prompted to request a new available date-and-time through the corresponding user PC device, seen in FIG. 6. Then, a request for the new available date-and-time is relayed from the corresponding user PC device, through the remote server, and to the corresponding administrator PC device, if the new available date-and-time is requested by the user account. The administrator account is then prompted to accept the request for the new available date-and-time through the corresponding administrator PC device. The new available date-and-time is appended into the plurality of available date-and-times with the remote server, if the request for the new available date-and-time is accepted by the administrator account, so that the new available date-and-time is integrated into the usage schedule. This allows the user account does not need to constantly request for access to the electronic device at the new date-and-time.

Figure 7:
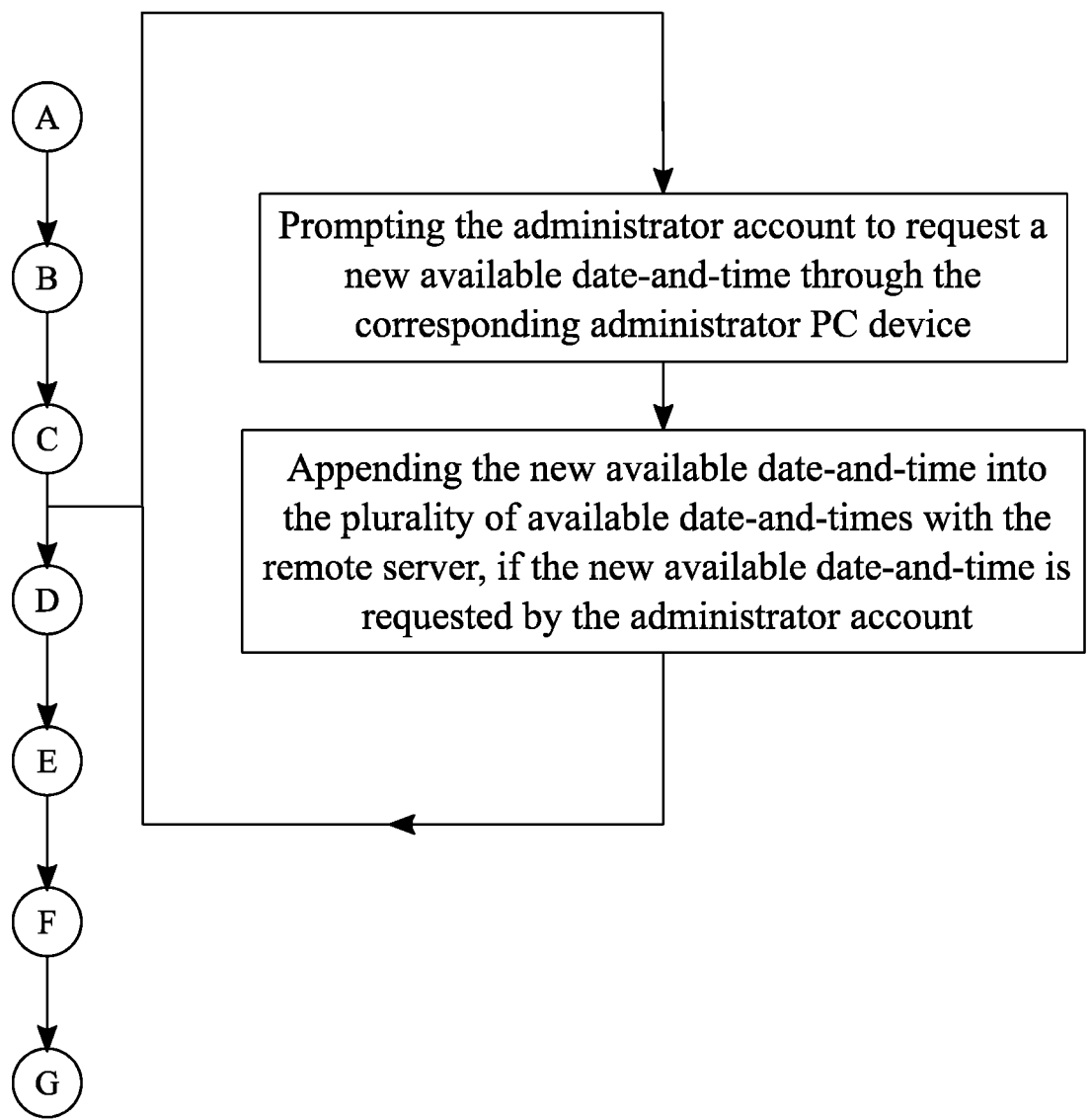
FIG. 7 is a flowchart illustrating the subprocess of adjusting a usage schedule, as prompted by an administrator account, by adding additional usage time for the plurality of available date-and-times.
Figure 8:
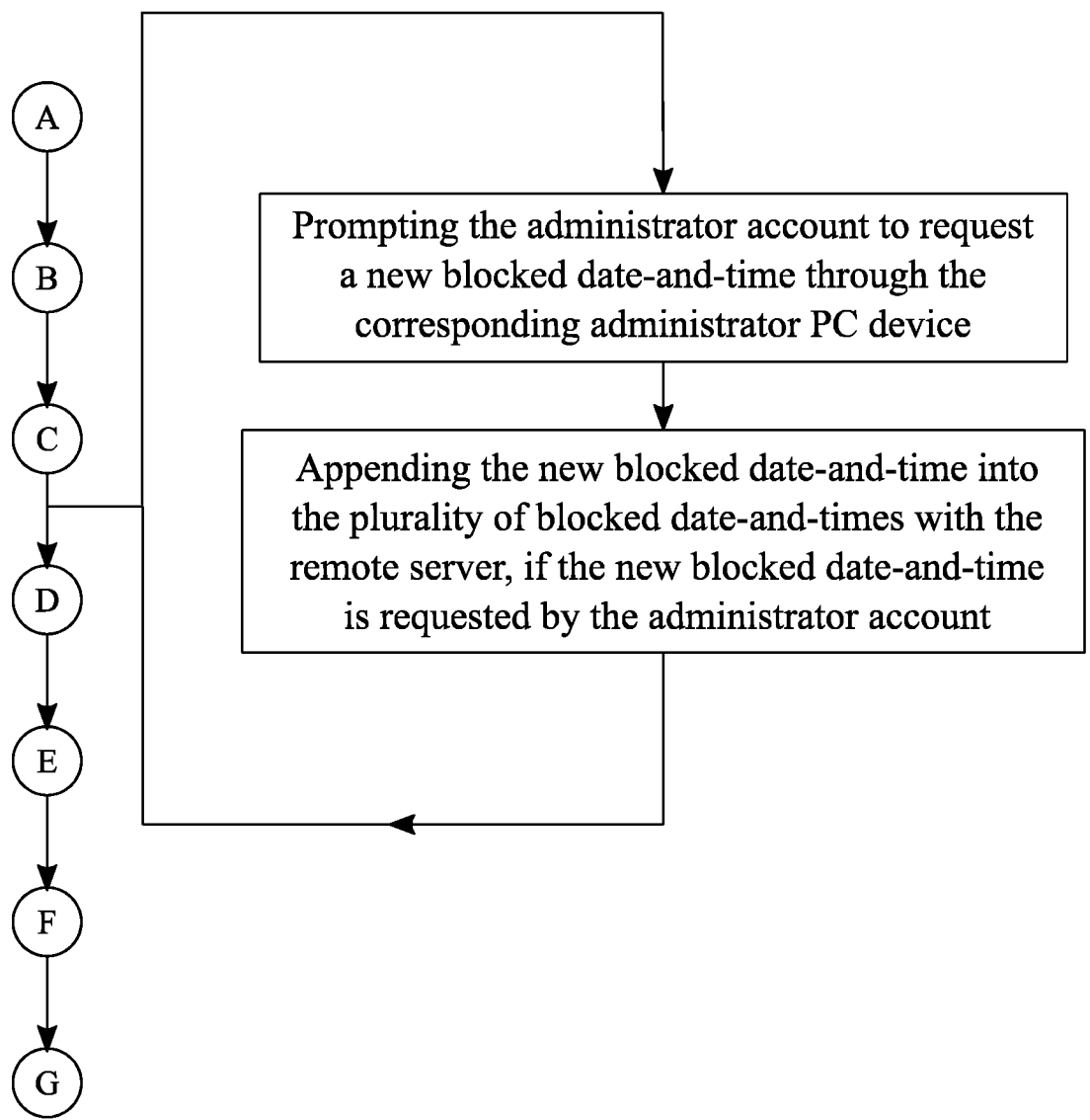
FIG. 8 is a flowchart illustrating the subprocess of adjusting a usage schedule, as prompted by an administrator account, by further limiting usage time for the plurality of blocked date-and-times.

The administrator account may also adjust the usage schedule as the administrator account sees fit without any request from the user account. In order to add additional time for the user account to engage with electronic device, the administrator account is prompted to request a new available date-and-time through the corresponding administrator PC device, seen in FIG. 7. The new available date-and-time is appended into the plurality of available date-and-times with the remote server, if the new available date-and-time is requested by the administrator account. Alternatively, n order to reduce the amount of time that the user account may engage with the electronic device, the administrator account is prompted to request a new blocked date-and-time through the corresponding administrator PC device, seen in FIG. 8. The new blocked date-and-time is appended into the plurality of blocked date-and-times with the remote server, if the new blocked date-and-time is requested by the administrator account. The usage schedule is then updated, and the use of the electronic device is further restricted.

Figure 9:
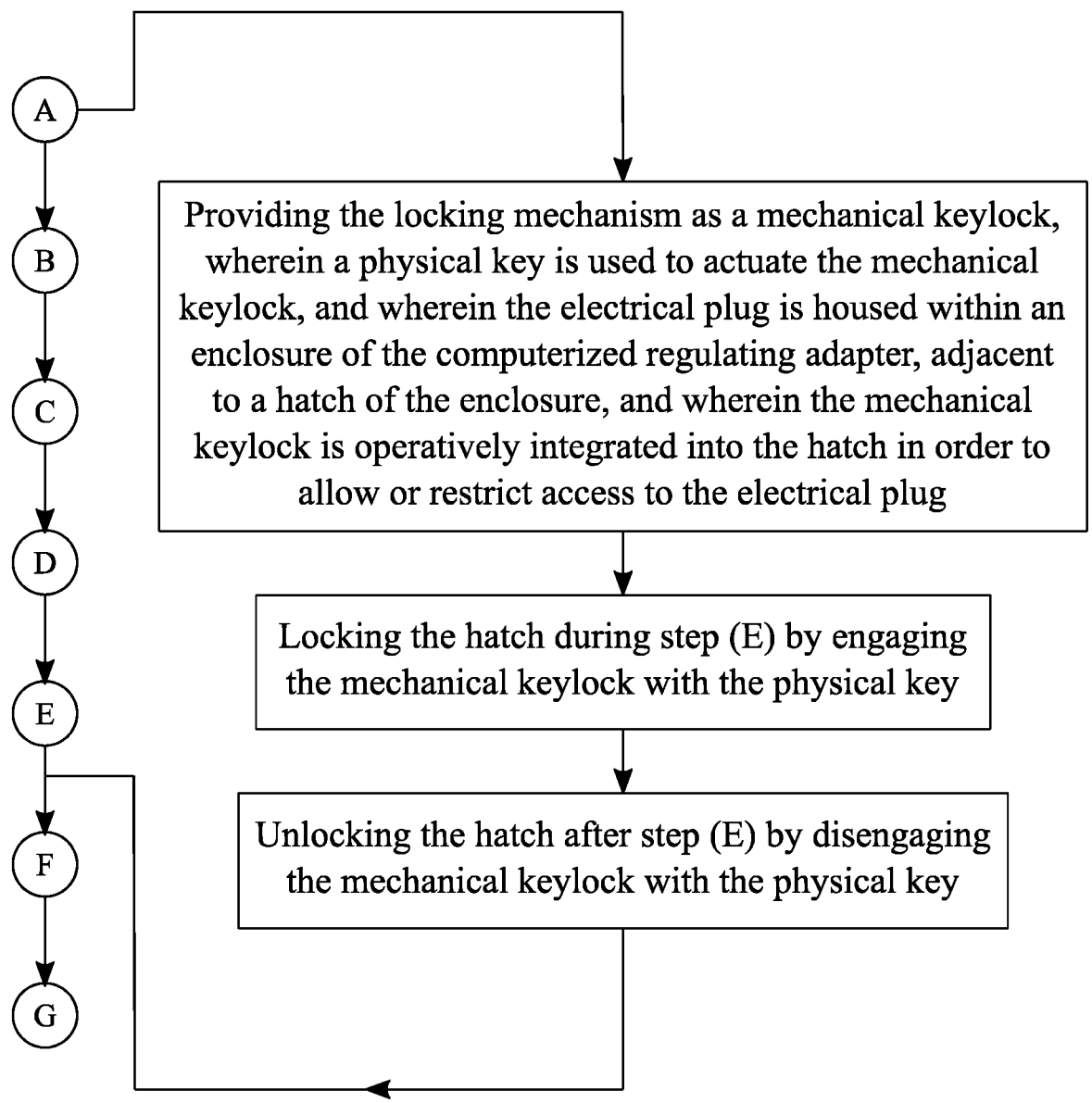
FIG. 9 is a flowchart illustrating the subprocess of locking and unlocking the locking mechanism with a key fob, provided the locking mechanism as a mechanical keylock.

In order to ensure the user simply does not unplug the electrical plug of the electronic device from the computerized regulating adapter, a first embodiment of the locking mechanism is provided as a mechanical keylock, seen in FIG. 9. Moreover, a physical key is used to actuate the mechanical keylock. The electrical plug is housed within an enclosure of the computerized regulating adapter, adjacent to a hatch of the enclosure, and the mechanical keylock is operatively integrated into the hatch in order to allow or restrict access to the electrical plug. Preferably, the computerized regulating adapter includes a couple inlets for a first electrical plug and a second electrical plug to be positioned within the enclosure so that a couple of electronic devices may be managed by the computerized regulating adapter. It is understood that various embodiments of the present invention may include a plurality of inlets for the computerized regulating adapter to manage a plurality of electronic devices. The hatch is also preferably hingedly connected with the enclosure for a simple attachment and release of the hatch with the enclosure. The arrangement of the electrical plug within the enclosure secures electronic connection between the electrical plug with the computerized regulating adapter. The electrical plug directly connects with an interfacing socket of the computerized regulating adapter in order to receive power from a corresponding outlet.

The hatch is locked during Step E by engaging the mechanical keylock with the physical key, preferably by the administrator, also seen in FIG. 9. Therefore, permission is required by the user from the administrator, if the electrical plug of the electronic device needs to be disconnected from the computerized regulating adapter. In order to disconnect the electronic plug from the computerized regulating adapter, the hatch is unlocked after Step E by disengaging the mechanical keylock with the physical key.

Figure 10:
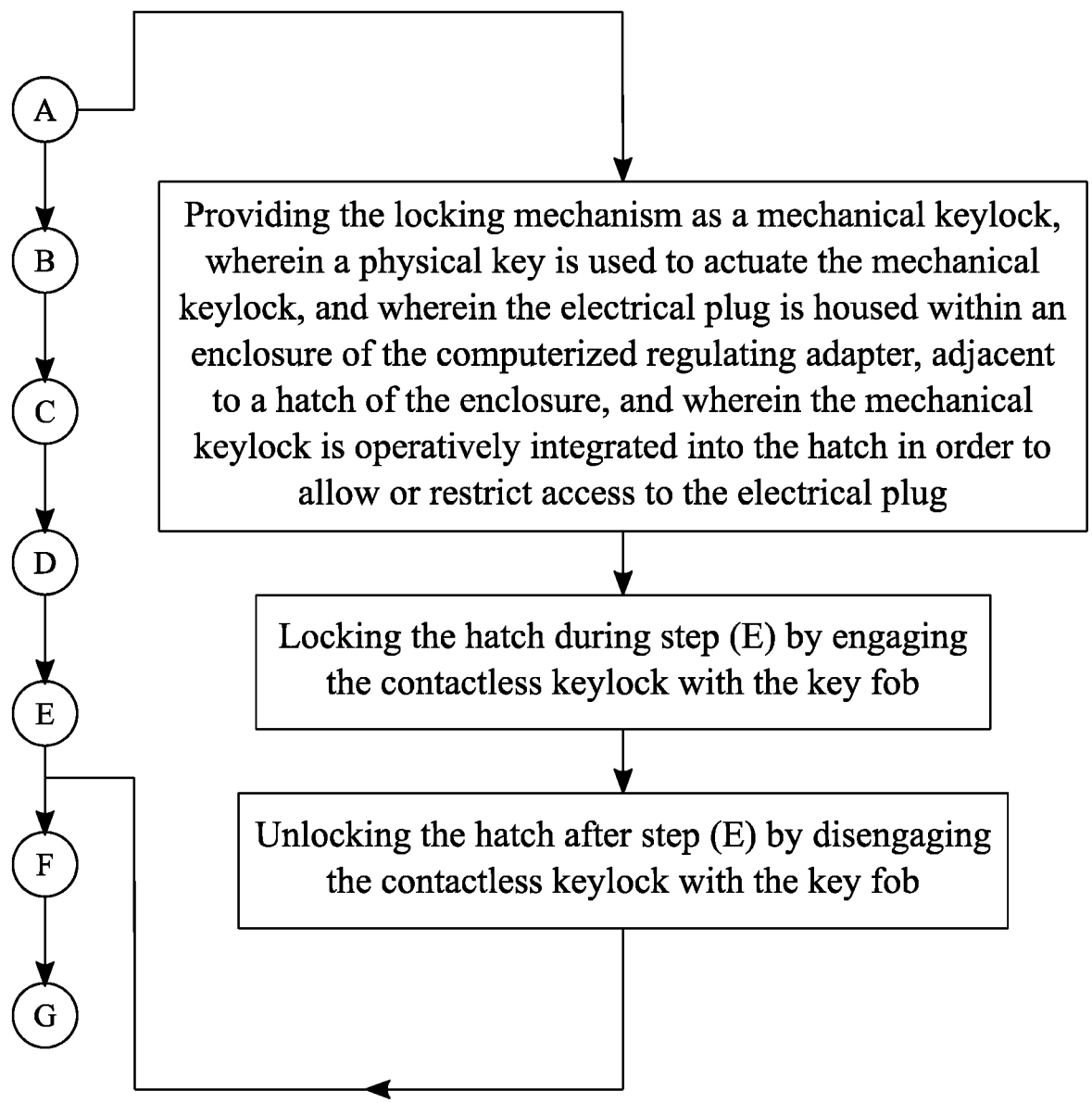
FIG. 10 is a flowchart illustrating the subprocess of locking and unlocking the locking mechanism with a physical key, provided the locking mechanism as a contactless keylock.

A second embodiment of the locking mechanism is provided as a contactless keylock and may be remotely controlled by the administrator account with the administrator PC device, seen in FIG. 10. A key fob is also used to actuate the contactless keylock by providing a secure encrypted wireless communication link between the contactless keylock and the key fob. Similarly, the electrical plug is housed within an enclosure of the computerized regulating adapter, adjacent to the hatch of the enclosure, and the contactless keylock is operatively integrated into the hatch in order to allow or restrict access to the electrical plug. This second embodiment preferably includes a solenoid lock and a wireless communication device that allows the administrator PC device to wirelessly communicate with the computerized regulating adapter. The contactless keylock may be automatically locked and unlocked with the solenoid lock. This arrangement secures electronic connection between the electrical plug with the computerized regulating adapter, while automatically locking and unlocking the locking mechanism. In this second embodiment, the hatch is locked during Step E by engaging the contactless keylock with the key fob. In order to disconnect the electronic plug from the computerized regulating adapter, the hatch is unlocked after Step E by disengaging the contactless keylock with the key fob.

Figure 11:
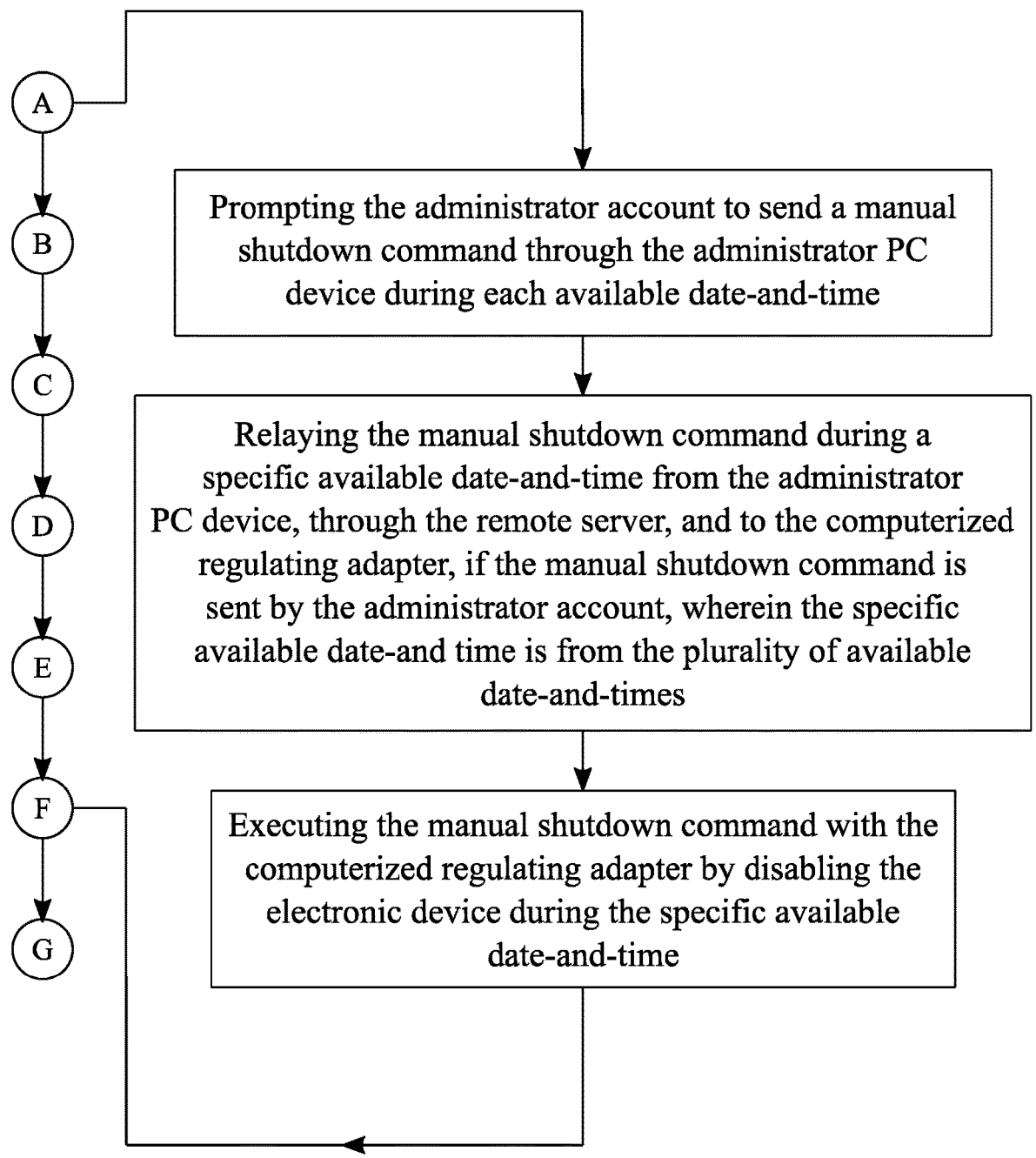
FIG. 11 is a flowchart illustrating the subprocess of remotely shutting down the power delivered to the electronic device by the administrator account.

For both embodiments of the locking mechanism, the administrator account is able to remotely control the power distribution from an outlet with the electronic device with the administrator PC device. In order to stop the delivery of power from the outlet to the electronic device, the administrator account is prompted to send a manual shutdown command through the administrator PC device during each available date-and-time, seen in FIG. 11. The manual shutdown command during a specific available date-and-time is relayed from the administrator PC device, through the remote server, and to the computerized regulating adapter, if the manual shutdown command is sent by the administrator account, wherein the specific available date-and-time is from the plurality of available date-and-times. This allows the remote server to process the manual shutdown command and implement the manual shutdown command. The manual shutdown command is executed with the computerized regulating adapter by disabling the electronic device during the specific available date-and-time, effectively disconnecting the distribution of power from the outlet to the electronic device with the electrical plug.

Figure 12:
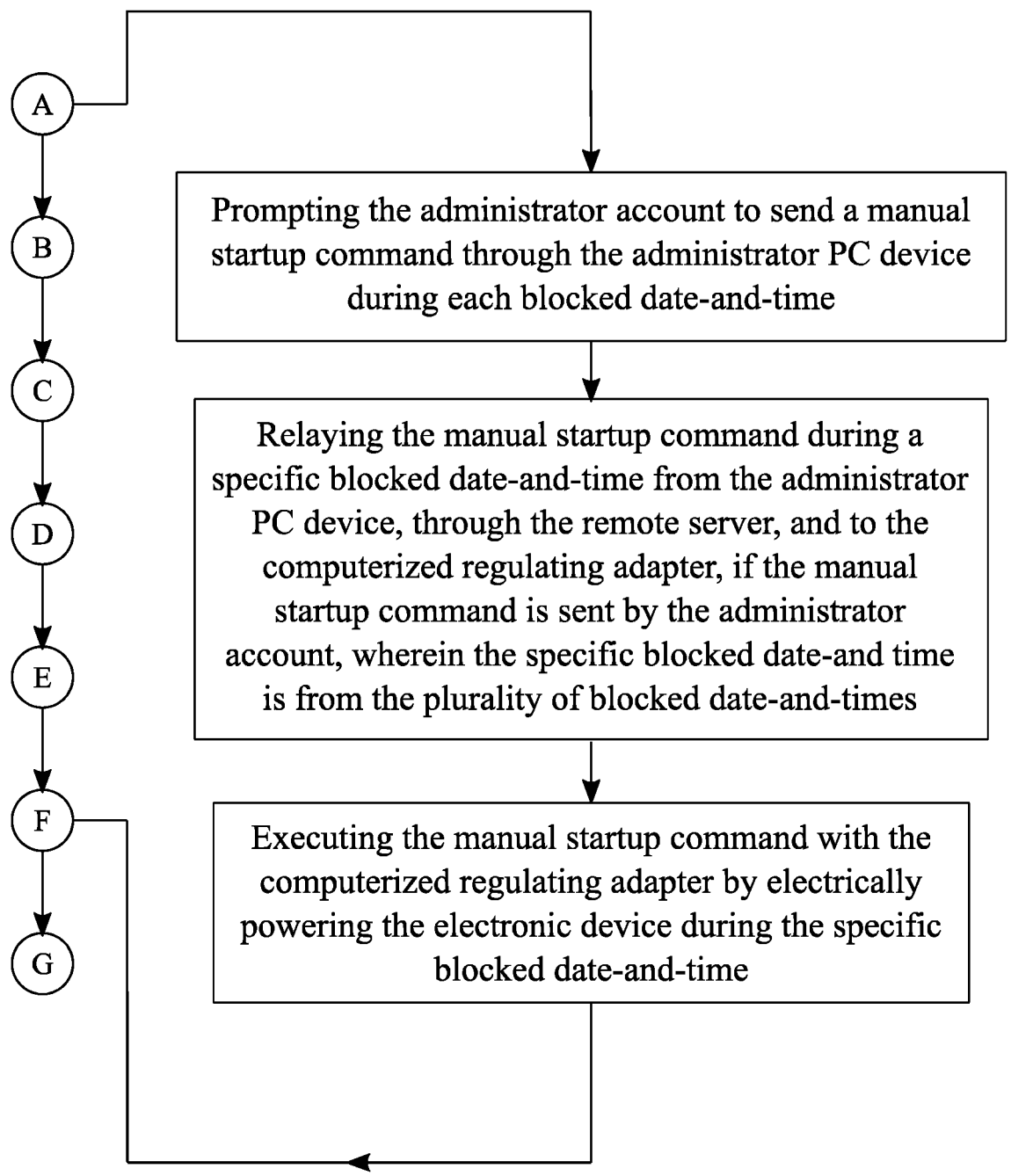
FIG. 12 is a flowchart illustrating the subprocess of remotely turning on the power delivered to the electronic device by the administrator account.

In order to enable the delivery of power from the outlet to the electronic device, the administrator account is prompted to send a manual startup command through the administrator PC device during each blocked date-and-time, seen in FIG. 12. The manual startup command is relayed during a specific blocked date-and-time from the administrator PC device, through the remote server, and to the computerized regulating adapter, if the manual startup command is sent by the administrator account, wherein the specific blocked date-and-time is from the plurality of blocked date-and-times. This allows the remote server to process the manual startup command and implement the manual startup command. The manual startup command is executed with the computerized regulating adapter by electrically powering the electronic device during the specific blocked date-and-time, effectively enabling the distribution of power from the outlet to the electronic device with the electrical plug.

Although the invention has been explained in relation to its preferred embodiment, it is to be understood that many other possible modifications and variations can be made without departing from the spirit and scope of the invention as hereinafter claimed.

What is claimed is:
1. A method of regulating usage of an electronic device, the method comprising the steps of:
(A) providing a user account and an administrator account managed by a remote server, wherein the user account is associated with a corresponding user personal computing (PC) device, and wherein the administrator account is associated with a corresponding administrator PC device;
(B) providing an electronic device, wherein the electronic device is associated to the user account and the administrator account;
(C) providing a computerized regulating adapter, wherein the computerized regulating adapter is configured to readily process data using a processing device and a storage device, and wherein the electronic device is electrically coupled to the computerized regulating adapter, and wherein a usage schedule of the electronic device is stored on the remote server, and wherein the usage schedule includes a plurality of available date-and times and a plurality of blocked date-and-times, and wherein the remote server, the electronic device, and the computerized regulating adapter are configured to readily exchange data amongst each other through a communication network, and wherein the computerized regulating adapter is configured to access the communication network with a communication interface;
(D) monitoring a current date-and-time with the computerized regulating adapter;
(E) physically securing an electrical plug of the electronic device to the computerized regulating adapter with a locking mechanism of the computerized regulating adapter;
(F) electrically powering the electronic device with the computerized regulating adapter, if the computerized regulating adapter matches the current date-and-time to an arbitrary available date-and-time by accessing the plurality of available date-and-times stored on the remote server through the communication network, wherein the arbitrary available date-and time is any date-and-time from the plurality of available date-and-times; and, (G) disabling the electronic device with the computerized regulating adapter, if the computerized regulating adapter matches the current date-and-time to an arbitrary blocked date-and-time by accessing the plurality of blocked date-and-times stored on the remote server through the communication network, wherein the arbitrary blocked date-and time is any date-and-time from the plurality of blocked date-and-times.

2. The method of claim 1, further comprising the steps of:
executing a plurality of iterations for steps (E) through (F), wherein a usage rate of the electronic device is tracked by the computerized regulating adapter during each iteration;
relaying the usage rate for each iteration from the computerized regulating adapter to the remote server;
compiling the usage rate for each iteration into a usage summarization report for the electronic device with the remote server; and,
outputting the usage summarization report for the electronic device with the corresponding administrator PC device.

3. The method of claim 2, further comprising the steps of:
prompting the administrator account to initiate communication with the user account through the corresponding administrator PC device;
establishing a line of communication between the administrator account and the user account through the remote server, if communication with the user account is initiated by the administrator account; and,
outputting the usage summarization report for the electronic device with the corresponding user PC device, if communication with the user account is initiated by the administrator account.

4. The method of claim 1, further comprising the steps of:
prompting the user account to request a new available date-and-time through the corresponding user PC device;
relaying a request for the new available date-and-time from the corresponding user PC device, through the remote server, and to the corresponding administrator PC device, if the new available date-and-time is requested by the user account;
prompting the administrator account to accept the request for the new available date-and-time through the corresponding administrator PC device; and,
appending the new available date-and-time into the plurality of available date-and-times with the remote server, if the request for the new available date-and-time is accepted by the administrator account.

5. The method of claim 1, further comprising the steps of:
prompting the administrator account to request a new available date-and-time through the corresponding administrator PC device; and,
appending the new available date-and-time into the plurality of available date-and-times with the remote server, if the new available date-and-time is requested by the administrator account.

6. The method of claim 1, further comprising the steps of:
prompting the administrator account to request a new blocked date-and-time through the corresponding administrator PC device; and, appending the new blocked date-and-time into the plurality of blocked date-and-times with the remote server, if the new blocked date-and-time is requested by the administrator account.

7. The method of claim 1, further comprising the steps of:
providing the locking mechanism as a mechanical keylock, wherein a physical key is used to actuate the mechanical keylock, and wherein the electrical plug is housed within an enclosure of the computerized regulating adapter, adjacent to a hatch of the enclosure, and wherein the mechanical keylock is operatively integrated into the hatch in order to allow or restrict access to the electrical plug; and,
locking the hatch during step (E) by engaging the mechanical keylock with the physical key.

8. The method of claim 7, further comprising the step of:
unlocking the hatch after step (E) by disengaging the mechanical keylock with the physical key.

9. The method of claim 1, further comprising the steps of:
providing the locking mechanism as a contactless keylock, wherein a key fob is used to actuate the contactless keylock, and wherein the electrical plug is housed within an enclosure of the computerized regulating adapter, adjacent to a hatch of the enclosure, and wherein the contactless keylock is operatively integrated into the hatch in order to allow or restrict access to the electrical plug; and,
locking the hatch during step (E) by engaging the contactless keylock with the key fob.

10. The method of claim 9, further comprising the step of:
unlocking the hatch after step (E) by disengaging the contactless keylock with the key fob.

11. The method of claim 1, further comprising the steps of:
prompting the administrator account to send a manual shutdown command through the administrator PC device during each available date-and-time;
relaying the manual shutdown command during a specific available date-and-time from the administrator PC device, through the remote server, and to the computerized regulating adapter, if the manual shutdown command is sent by the administrator account, wherein the specific available date-and-time is from the plurality of available date-and-times; and,
executing the manual shutdown command with the computerized regulating adapter by disabling the electronic device during the specific available date-and-time.

12. The method of claim 1, further comprising the steps of:
prompting the administrator account to send a manual startup command through the administrator PC device during each blocked date-and-time;
relaying the manual startup command during a specific blocked date-and-time from the administrator PC device, through the remote server, and to the computerized regulating adapter, if the manual startup command is sent by the administrator account, wherein the specific blocked date-and time is from the plurality of blocked date-and-times; and,
executing the manual startup command with the computerized regulating adapter by electrically powering the electronic device during the specific blocked date-and-time.

* * * * *